United States Patent [19]
Eggena

[11] Patent Number: 5,435,117
[45] Date of Patent: Jul. 25, 1995

[54] ROTARY MOWER WITH AUTOMATIC ENGINE CUT OFF

[76] Inventor: Dean A. Eggena, P.O. Box 400, Fawn Lake Rd., Crosslake, Minn. 56442

[21] Appl. No.: 310,855

[22] Filed: Sep. 22, 1994

[51] Int. Cl.⁶ .............. A01D 34/64; A01D 34/80; A01D 34/82
[52] U.S. Cl. .................. 56/10.2 D; 56/15.9; 56/11.9
[58] Field of Search .............. 56/10.2 R, 10.5, 11.9, 56/11.3, 11.7, 10.2 D, 10.2 E, 15.9

[56] References Cited

U.S. PATENT DOCUMENTS

| | | | |
|---|---|---|---|
| 3,633,699 | 1/1972 | Bishop | 56/11.8 X |
| 3,773,156 | 11/1973 | Nuquist | 56/10.2 R |
| 3,874,149 | 4/1975 | Seifert et al. | 56/320.2 X |
| 4,126,989 | 11/1978 | Oosterling et al. | 56/11.9 X |
| 4,183,195 | 1/1980 | James | 56/11.9 |
| 4,206,580 | 6/1980 | Traux | 56/11.9 X |
| 4,570,425 | 2/1986 | Carr | 56/11.9 X |

Primary Examiner—Stephen J. Novosad
Attorney, Agent, or Firm—Kinney & Lange

[57] ABSTRACT

A rotary mower includes a housing which contacts a ground surface to be mowed, a blade mounted for rotation in the housing a motor mounted to the housing for driving the blade, and an actuator mechanism for disabling rotation of the blade when the housing is displaced a predetermined distance from the ground surface.

19 Claims, 4 Drawing Sheets

1

ROTARY MOWER WITH AUTOMATIC ENGINE CUT OFF

BACKGROUND OF THE INVENTION

The present invention relates to rotary mowers and brush cutters (hereinafter collectively referred to as rotary mowers), which run over a ground surface and which have a cutting blade for cutting grass, weeds, brush and the like, and more particularly, to a motorized rotary mower having an automatic engine cut off or blade control.

There are two basic types of rotary mowers: free standing rotary mowers and rotary mower attachment units. Free standing rotary mowers are independent units which include a mower deck, a cutting blade contained within the mower deck, either an electric or a gas engine for driving the cutting blade, and a frame structure including a wheel base allowing the mower deck to be over a ground surface. Rotary mower attachment units are for use with skid steer loaders or other self-powered vehicles. These rotary mower attachment units include a mower deck, a cutting blade contained within the mower deck, a motor for driving the cutting blade, and a mounting plate for mounting the rotary mower attachment to the loader or other vehicle. The motor of the rotary mower attachment units is powered by the energy produced by the serf-powered vehicle to which the unit is attached. For example, rotary mower attachment units for skid steer loaders often include hydraulic motors which are connected to the hydraulic system of the loader.

One of the problems common to all mowers and in particular to rotary mower attachment units is that the cutting blade continues to rotate regardless of the positioning of the mower deck. Some mowers include hand-operated blade cut-off switches which deactivate the entire mower when the operator releases the switch. However, a dangerous and unsafe situation persists with all rotary mowers in that when the mower deck is pivoted or raised off the ground surface for transport or for avoiding objects on the ground surface, the blade is exposed and continues to rotate.

SUMMARY OF THE INVENTION

The present invention relates a rotary mower having a housing in contact with a ground surface to be mowed, a blade mounted for rotation within the housing, a motor mounted to the housing for driving the blade, and an actuator or control mechanism for disabling rotation of the blade when the housing is displaced a predetermined distance from the ground surface. The actuator mechanism thus reduces or eliminates the unsafe situation where the rotating blade is exposed when the mower deck is raised.

If the present invention is embodied on a rotary mower attachment unit, a mounting plate is provided for mounting the housing to an externally driven vehicle such as a skid steer loader. The ends of the mounting plate are hingedly attached to the housing such that the housing pivots with respect to the mounting plate thereby triggering the actuator mechanism. If a hydraulic motor is employed, the actuator mechanism includes a diverter valve, an actuator button and a cam surface. The diverter valve diverts hydraulic fluid from the hydraulic motor when the end of the housing is a predetermined distance from the ground surface. The actuator button operates with the diverter valve and the cam surface such that as the end of the housing moves out of contact with the ground surface the actuator button moves along the cam surface until the actuator button reaches a predetermined position wherein the diverter valve is activated.

It is to be understood that the present invention may be embodied in any type of mower, regardless of the type of motor employed for driving the cutting blade.

DETAILED DESCRIPTION OF THE PREFERRED EMBODIMENTS

It is to be understood that the present invention has application to any type of rotary mower regardless of whether the mower is an attachment unit or a free standing unit. In addition, the present invention has application to any rotary mower regardless of the type of motor used to rotate the blade and may be used with, for example, gas powered, electric or hydraulic motors. Thus, while the present invention is described with reference to a hydraulically operated rotary mower attachment unit 10 for a skid steer loader 11, additional applications will be apparent.

Figure 1:
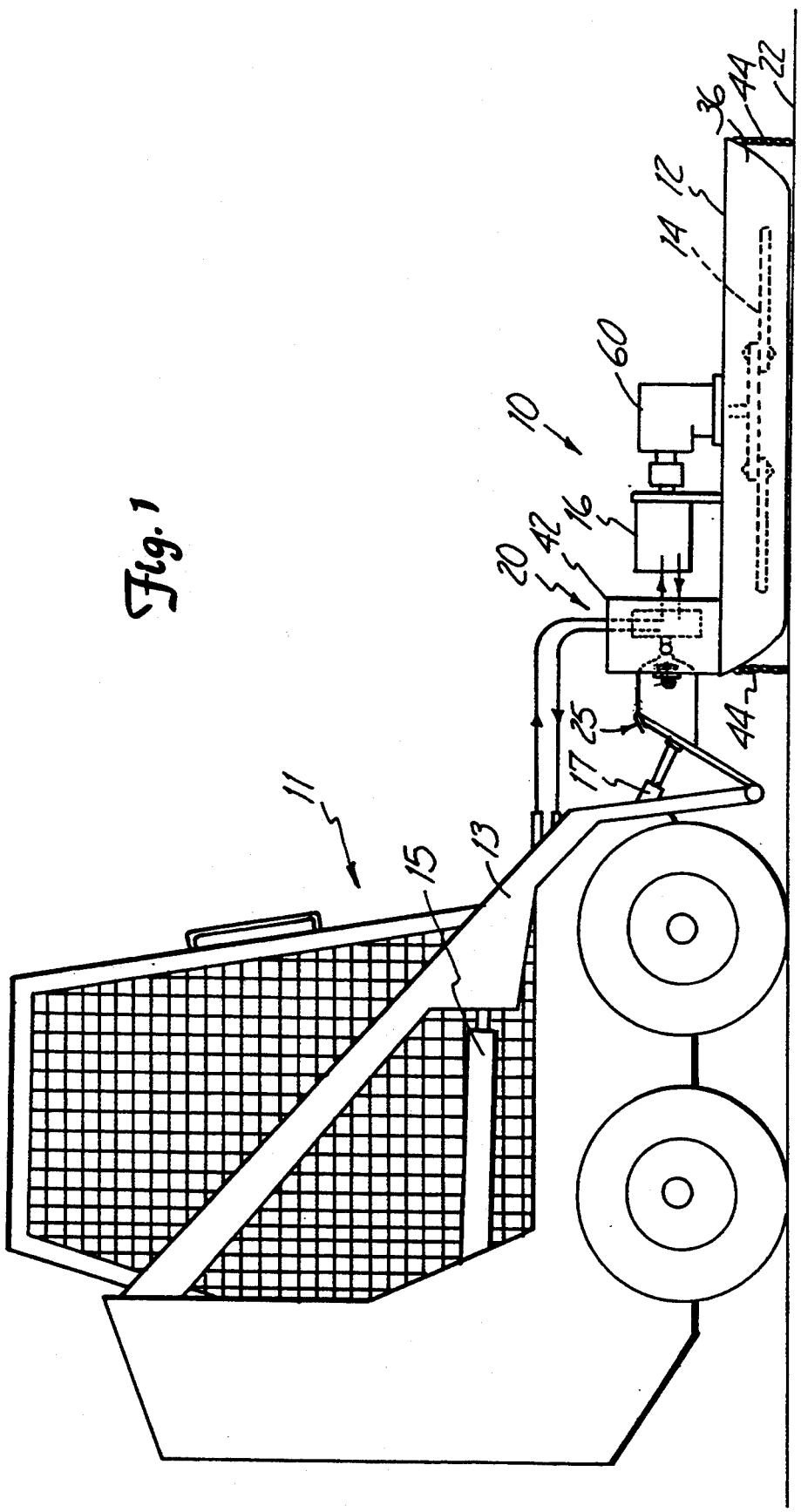
FIG. 1 is a side elevation of a skid steer loader with a rotary mower attachment unit according to the present invention, the rotary mower attachment unit being shown in a first position.
Figure 2:
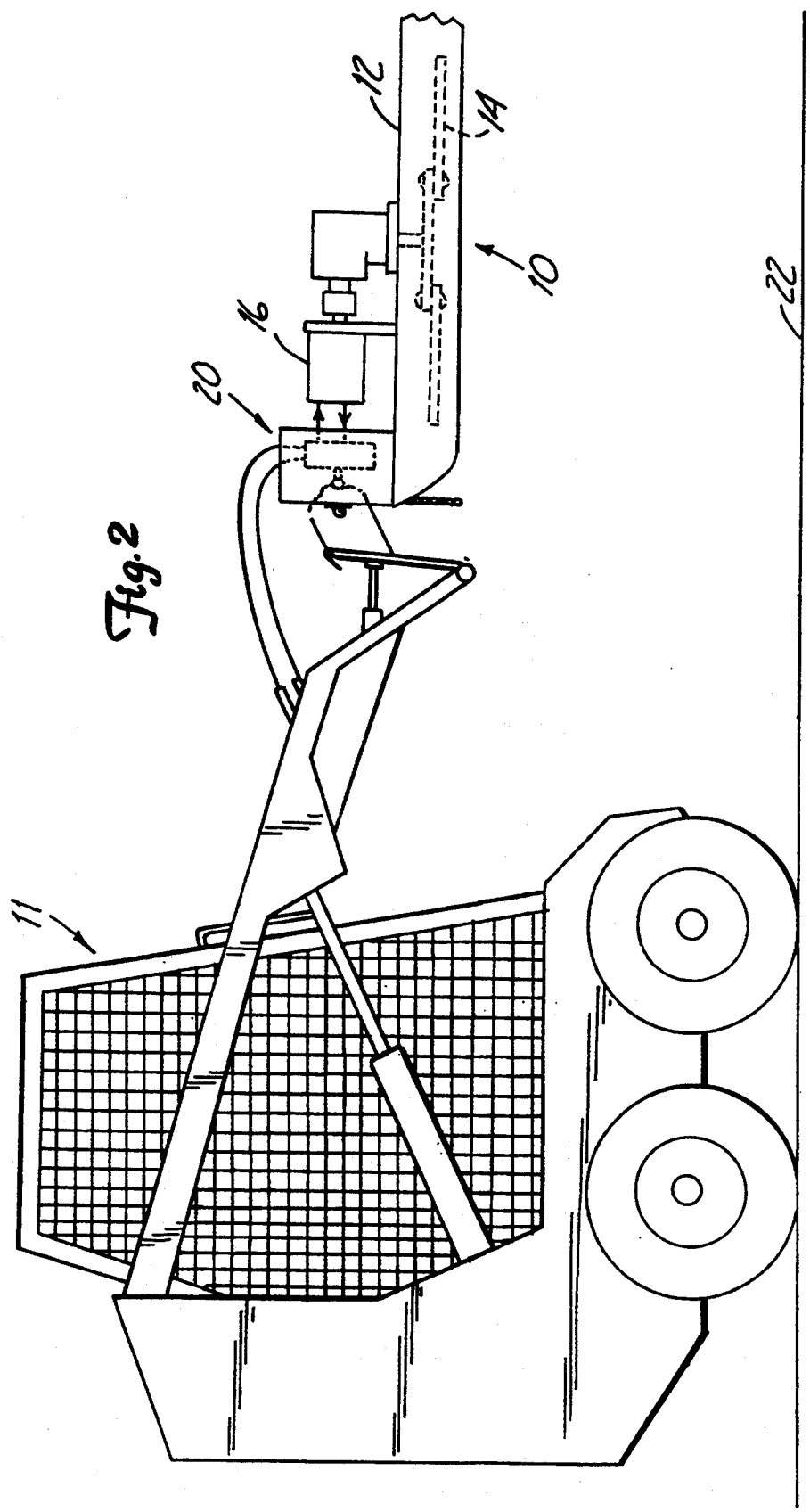
FIG. 2 is a side elevation of a skid steer loader and rotary mower attachment unit with the rotary mower attachment unit shown in a second position.

As shown in FIGS. 1 and 2, the rotary mower attachment unit 10 includes a mower deck or housing 12, a cutting blade 14 rotatable within the mower deck 12, a motor 16 for driving the blade 14, and a blade cut off mechanism 20 for disabling rotation of the blade 14 when an end of the mower deck 12 is raised a predetermined distance from a ground surface 22. As soon as the end of the mower deck 12 returns below the predetermined distance from the ground surface 22 the blade 14 is again enabled for cutting. A mounting plate 25 attaches the rotary mower attachment unit 10 to a boom arm 13 of the skid steer loader 11. The rotary mower attachment unit 10 may be displaced with respect to the ground surface by operation of a boom arm hydraulic piston and cylinder 15 or a bucket-tip hydraulic piston and cylinder 17.

The mower deck 12, the cutting blade 14, and the motor 16 are conventional components well known in the art of rotary mowers and so are only explained briefly herein.

Figure 3:
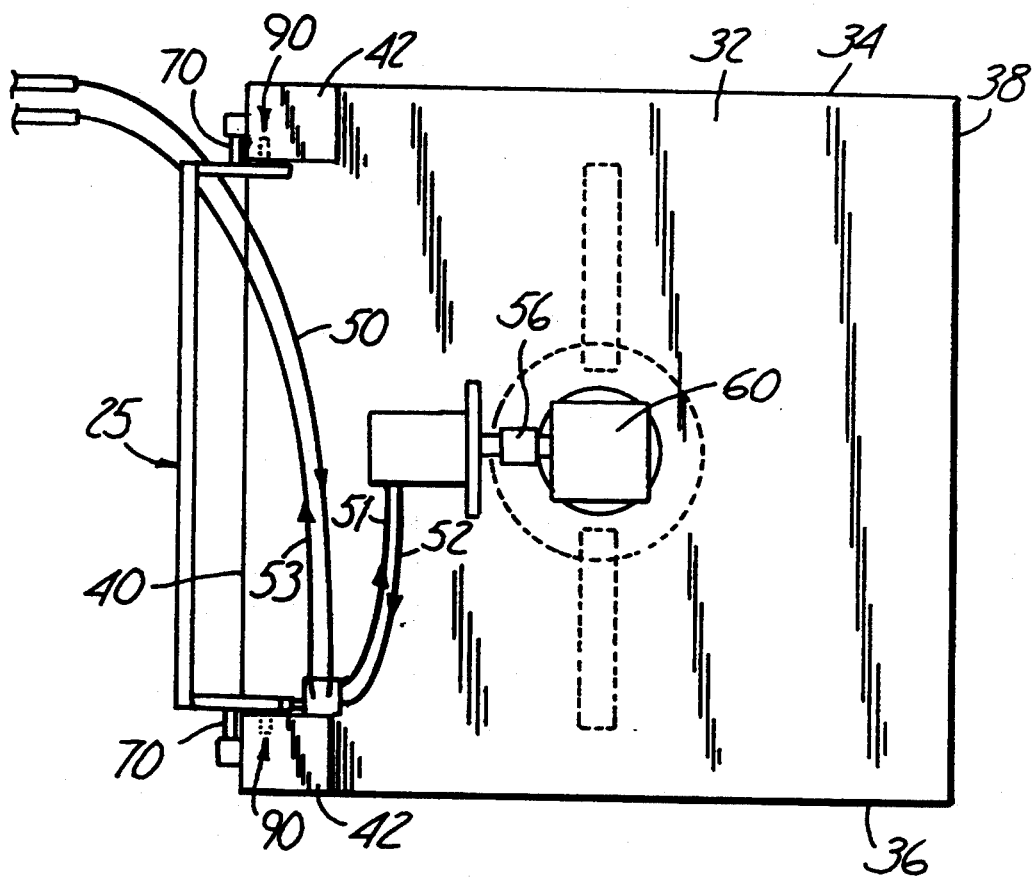
FIG. 3 is a top plan view of the rotary mower attachment unit.

As shown in FIG. 3 the mower deck 12 is of a generally square, metallic construction and includes a top surface 32, a first side surface 34, a second side surface 36 a front end 38, a rear end 40, and a pair of towers 42 in each of the corners at the rear end 40 of the mower deck 12. Each tower 42 is rectangular and has dimensions of approximately 6" in width, 10" in length, and 12" in height. Each tower 42 is constructed of steel and is welded to the corners of the rear end 40 of the mower deck 12. Each tower 42 provides a mounting location for the mounting plate, and one of the towers is a housing for the blade cut off mechanism 20 as further described below. The first side surface 34 and second side surface 36 extend between a front end 38 and a rear end 40 of the mower deck 12 and run generally in contact with the ground surface 22 to be mowed. The front end 38 and the rear end 40 of the mower deck 12 are open to allow the surface to be mowed to enter the mower deck 12 and be exposed to the cutting blade 14. A safety chain 44 (see FIGS. 1 and 2) attached across the front and rear ends 38 and 40 of the mower deck 12 prevents flying debris from exiting the mower deck 12 at high velocities.

The cutting blade 14 includes a center mounting plate and a pair of mower blades attached to the mounting plate 180° apart from each other. The cutting surfaces of the cutting blade 14 are positioned so as to cut in only one direction.

Figure 4:
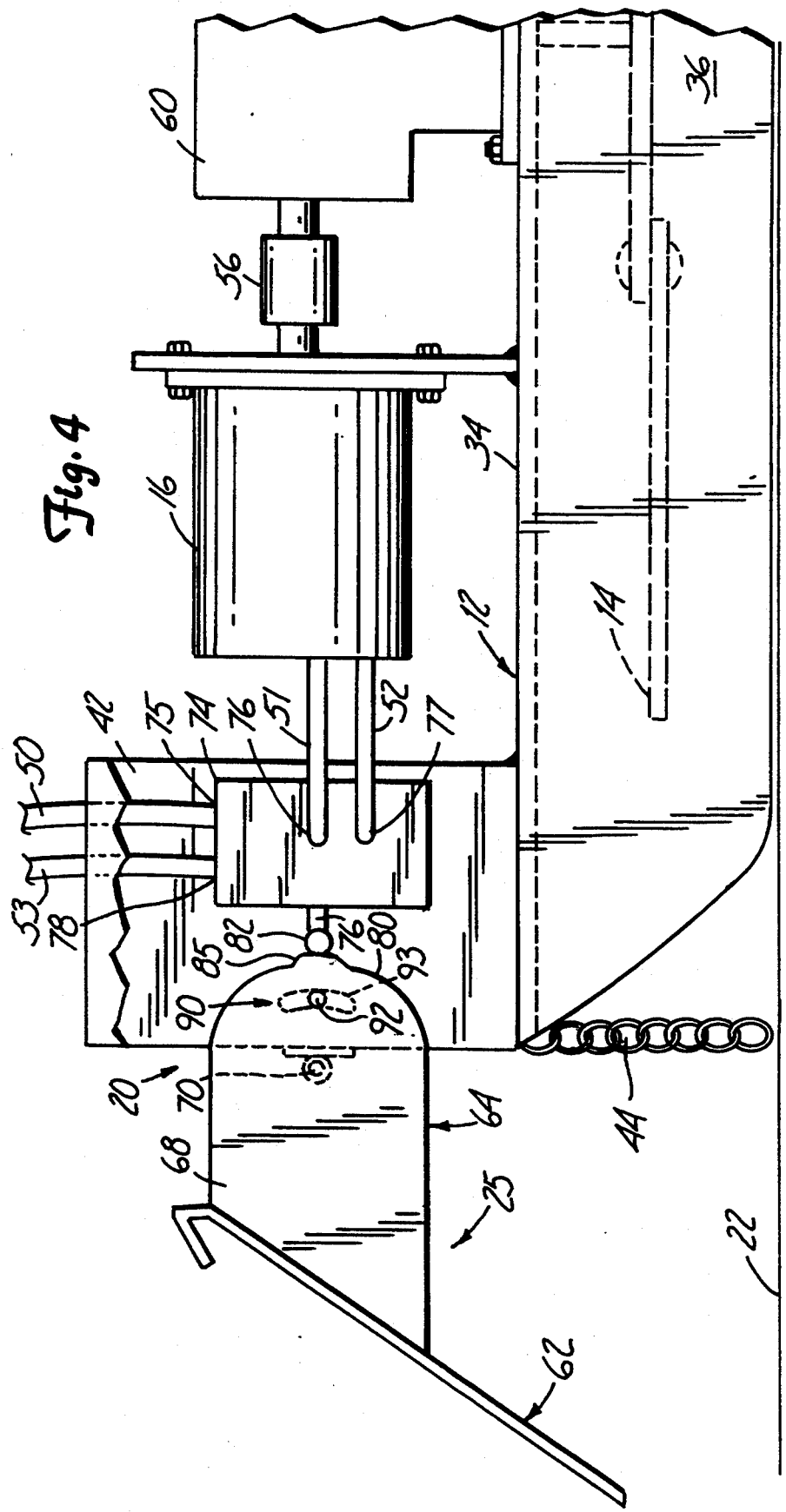
FIG. 4 is an enlarged side elevation of a portion of the rotary mower attachment unit.

As shown in detail in FIGS. 3 and 4, the motor 16 is mounted to the top surface 32 of the mower deck 12. The motor 16 is a hydraulic motor connected to and powered by the hydraulic system (not shown) of the skid steer loader 11 through supply hoses 50 and 51 and return hoses 52 and 53. The supply hoses 50 and 51 supply hydraulic fluid from the hydraulic system of the skid steer loader 11 to the motor 16. The return hoses 52 and 53 return hydraulic fluid from the motor 16 to the skid steer loader 11. A coupling 56 transfers the output of the hydraulic motor 16 to an angle drive 60 which redirects the output of the hydraulic motor 16 to the cutting blade 14.

The mounting plate 25 includes a mating section 62 fixedly attached to the boom arm 13 of the skid steer load 11 for securing the rotary mower attachment unit 10 to the loader 11, and a hinge section 64 pivotally attaching the mower deck 12 to the mating section 62. There are a variety of well known constructions available for the mating section 62 of the mounting plate 25 depending on the particular type and manufacturer of the loader to which the rotary mower attachment unit 10 is mounted. On the other hand, the hinge section 64 of the mounting plate includes a hinge plates 68 at each end of the mating section 62 for engaging the towers 42 in the mower deck 12, a pair hinge pins 70 for hingedly engaging the hinge plate 68 to towers 42, and a pair of stop mechanisms 90 for limiting the pivotal range of the mower deck 12. One of the hinge returns 64 supports a portion of the blade cut off mechanism 20 as further explained below. Each hinge pin 70 is mounted in a free swivel arrangement allowing the mower deck 12 to pivot upward and downward in relation to the fixed mounting plate 25.

The blade cut off mechanism 20 includes a diverter switch 74 for diverting the hydraulic fluid from passing through the hydraulic motor 16, and a plunger actuator 76 operable with diverter switch 74 for triggering the diverter switch 74, and a cam surface 80 and cam follower 82 which control the plunger actuator 76. The blade cut off mechanism 20 is mounted in one of the towers on the top surface 37 of the mower deck 12. The diverter switch 74 is a diverter/cushion valve having an supply input 75 for receiving hydraulic fluid from the loader 11 from supply line 50, a supply output 76 for outputting hydraulic fluid to the hydraulic motor 16 along line 51, a return input 77 for receiving hydraulic fluid from the hydraulic motor 16 along line 52, and a return output 78 for returning hydraulic fluid to the loader 11 along line 53. The diverter/cushion valve is a combination of a diverter valve which diverts the hydraulic fluid away from the hydraulic motor 16 and a cushion valve which provides a controlled cut off of the hydraulic fluid to avoid breakage or jamming of the hydraulic motor 16 coupling or angle drive 60. A bias spring (not shown) operates the plunger actuator 76 for triggering the diverter/cushion valve. In a normal position (see FIG. 1) the plunger actuator 76 is compressed and the diverter/cushion valve is in a position permitting hydraulic fluid to flow to the hydraulic motor 16, while in the cut-off position (see FIG. 2) the plunger actuator 76 is extended and the diverter/cushion valve is in a position redirecting the hydraulic fluid away from the hydraulic motor 16 and back to the loader 11. The combination diverter/cushion valve and plunger actuator 76 is available as Part No. RC6030R from J.N. Fauver Company, 10286 W. 70th Street, Eden Prairie, Minn.

The stop mechanism 90 limits the pivotal range of the mower deck 12 and includes a pin 92 mounted to the tower 42 and operable with a slot 93 on the hinge plate. The stop pin 92 moves within the slot 93 thereby allowing the mower deck 12 to pivot in a range determined by the length of the slot 93. The longer the slot 93 the more angle is achieved between the mower deck 12 and the mounting plate 25 and this varies depending on the application. When the boom arm piston 15 or bucket-tip piston 17 is activated the rear end of the mower deck 12 is raised upward. At a predetermined distance above from the ground surface the stop pin 92 engages a lower edge of the slot 93 thereby allowing the entire mower deck 12 to be raised off the ground surface 22 to transport the rotary mower attachment unit 10 or to move the mower deck 12 if it becomes stuck in mud or the like or in the event of an unmowable obstacle on the ground surface.

The cam surface 80 is located on the end of the hinge plate 68. The cam surface 20 includes a center ridge 85 and recessed portions on either side of the ridge 85. In the run position the cam follower 82 is positioned on the ridge 85 such that hydraulic fluid flows through the diverter/cushion valve into the hydraulic motor 16. In the run position both ends of the mower deck 12 are in contact with and parallel to the ground surface. If the boom 13 is raised or lowered so that an end of the mower deck 12 is displaced with respect to the ground surface, the cam follower 82 rolls off the ridge 85 and the plunger actuator 76 thereby activates the diverter/cushion valve to redirect the hydraulic fluid flowing out supply output 76 back through the return outlet 78 such that no hydraulic fluid passes along lines 51 and 52 to or from the hydraulic motor 16.

The length of the ridge 85 determines the distance above the ground surface 22 which an end of the mower deck 12 must be raised in order to deactivate the cutting blade 14. The longer the ridge 85 the greater the pivot angle between the mower deck 12 and the mounting plate 25 needed in order for the plunger actuator 76 to activate the diverter/cushion valve and cut off hydraulic fluid to the hydraulic motor 16. In other words, the shorter the ridge 85 the lower the displacement of an end of the mower deck 12 with respect to the ground surface 22 needed and the larger the ridge 85 the greater the displacement of an end of the mower deck 12 needed in order to stop cutting blade 14.

It is to be understood that the plunger actuator 76, cam follower 82 and cam surface 80 may be arranged such that the cam surface includes actuator 76 a central recess surrounded by ridges when the mower deck 12 is in full contact with the ground surface 22 and that upon movement of the mounting plate 25 with respect to the mower deck 12 the plunger actuator 76 is depressed thereby activating the diverter/cushion valve. The former arrangement is preferred in that it provides a fall-/safe "off" position in the event of a malfunction in the blade cut off mechanism 20 wherein the cutting blade 14 in not engaged.

In operation, the rotary mower attachment unit 10 is mounted on the boom arm 13 of the skid steer loader by engagement of the mounting plate 25 to a corresponding section or the bucket tip. The bucket tip hydraulic cylinder 17 is adjusted to maintain the mower deck 12 in full contact with Found surface and such that the actuator plunger 76 is centered on the ridge 85 of the cam surface 80. In this position hydraulic fluid from the hydraulic system of the loader 11 flows through the hydraulic hoses 50–53 and diverter/cushion valve into the hydraulic motor 16 for rotating the cutting blade 14. As the mower deck 12 skids along the ground surface 22 the mower deck 12 pivots about of the hinge pin 70 with respect to the mounting plate 25. The length of the ridge 85 of the cam surface 80 is selected such that the general movement of the mower deck 12 along the ground surface 22 does not actuate the diverter/cushion valve. However, when either the hydraulic cylinder 12 for the bucket tip or the hydraulic cylinder 15 for the boom arm 11 is moved such that the mower deck 12 is displaced from the ground surface 22 for avoiding unmowable objects on the ground surface or for transport or the like. The angle between the mower deck 12 and the hinge plate 25 changes. The angle changes to the point where the cam follower 82 rolls off the ridge 85 into the recess such that the plunger actuator 76 thereby triggers the diverter/cushion valve to cut off the flow of hydraulic fluid to the hydraulic motor 16. More particularly, hydraulic fluid entering the supply inlet 75 of the diverter/cushion valve along the supply line 50 is redirected to the return outlet 78 of the diverter/cushion valve back to the loader 11 along return line 53. Thus, with no hydraulic fluid flowing through the hydraulic motor 16 the cutting blade 14 does not rotate. As the mower deck 12 continues to be raised off the ground surface the pin 92 engages the slot 93 of the tower 42 to fix the angle of the mower deck 12 with respect to the mounting plate 25 for transport of the rotary mower attachment unit 10. The length of the slot is selected with respect to the length of the ridge 85 of the cam surface 85 such that the hydraulic motor 16 is always cut off before the pin 92 engages an end of the slot 93. Upon placement of the mower deck 12 back in contact with the ground surface 22 the cam follower 82 again is moved onto the ridge 85 thereby resetting the diverter/cushion valve to its original position where the hydraulic fluid flows through the supply outlet 76 along supply line 51 into the hydraulic motor 16 and back through the return line 52 into return inlet 77 such that the cutting blade 14 is again rotated.

Although the present invention has been described with reference to preferred embodiments, workers skilled in the art will recognize that changes may be made in form and detail without departing from the spirit and scope of the invention.

What is claimed:

1. A rotary mower comprising:
   a housing;
   a blade mounted for rotation within the housing;
   a motor mounted to the housing for driving the blade; and
   an actuator mechanism for disabling rotating of the blade in response to raising of the housing a predetermined distance from the ground surfaces.

2. The rotary mower of claim 1, further comprising:
   mounting means for mounting the housing to an external powered vehicle.

3. The rotary mower of claim 2, wherein the mounting means includes a mounting plate having a first portion which mounts to the external powered vehicle and a second portion hingedly attached to the housing such that the housing pivots with respect to the mounting plate.

4. The rotary mower of claim 3, wherein the actuator mechanism includes means for sensing the pivoting of the housing with respect to the mounting plate.

5. The rotary mower of claim 3, further comprising:
   stop means mounted to the mounting plate and operable with the housing for limiting the pivotal movement of the housing with respect to the mounting plate.

6. The rotary mower of claim 1, wherein the motor is a hydraulic motor and wherein hydraulic hoses feed hydraulic fluid from the externally powered vehicle to the hydraulic motor.

7. The rotary mower of claim 6, wherein the actuator mechanism includes a diverter valve mounted to the hydraulic hoses and operable with the hydraulic motor such that the hydraulic fluid is diverted from the hydraulic motor when the housing is displaced the predetermined distance from the ground surface.

8. The rotary mower of claim 7, wherein the actuator mechanism includes an actuator button operable with the diverter valve and a cam surface operable with the actuator button such that as the housing moves out of contact with the ground surface the actuator button moves along the cam surface until the actuator button reaches the predetermined position wherein the diverter valve is activated.

9. The rotary mower of claim 8, wherein the actuator means further includes a cushion valve.

10. The rotary mower of claim 1, wherein the actuator mechanism includes a means for sensing pivotal movement of the housing with respect to the ground surface.

11. The rotary mower of claim 10, further comprising:
    stop means for limited the pivotal movement of the housing.

12. In a rotary mower having a mower deck, a blade within the mower deck, and a motor for driving the blade, improvement comprising a control switch for disabling rotation of the blade in response to displacing the mower deck a predetermined distance from the ground surface and for enabling rotation of the blade in response to positioning of the mower deck a distance from the ground surface which is less than the predetermined distance from the ground surface.

13. The rotary mower of claim 12, wherein the control switch diverts power to the motor when the mower deck is not parallel with the ground surface such that the rotation of the blade is stopped.

14. The rotary mower of claim 12, further comprising:
    mounting means for mounting the mower deck to a skid steer loader.

15. The rotary mower of claim 14, wherein the mounting means includes a mounting plate having ends hingedly attached to the mower deck such that the mower deck pivots with respect to the mounting plate.

16. The rotary mower of claim 15, wherein the control switch includes means for sensing the pivoting of the mower deck with respect to the mounting plate.

17. The rotary mower of claim 15, further comprising:
a stopping member on the mounting plate, the stopping member being operable with the mower deck for limiting the pivotal movement of the mower deck with respect to the mounting plate.

18. The rotary mower of claim 14, further comprising:
a cam follower operable with the control switch; and
a cam surface on the mounting plate, the cam surface being operable with the cam follower such that as the mower deck is pivoted away from the ground surface the cam follower moves along the cam surface the predetermined distance until the control switch is activated.

19. The rotary mower of claim 12, further comprising:
a cam follower operable with the control switch; and
a cam surface operable with the cam follower such that as the mower deck is pivoted away from the ground surface the cam follower moves along the cam surface the predetermined distance until the control switch is activated.

* * * * *

UNITED STATES PATENT AND TRADEMARK OFFICE
CERTIFICATE OF CORRECTION

PATENT NO. : 5,435,117
DATED : July 25, 1995
INVENTOR(S) : DEAN EGGENA

It is certified that error appears in the above-indentified patent and that said Letters Patent is hereby corrected as shown below:

Col. 1, line 28, delete "serf-powered", insert --self-powered--

Col. 5, line 4, delete "fall-", insert --fail- --

Col. 5, line 13, delete "found", insert --ground--

Signed and Sealed this

Tenth Day of October, 1995

*Attest:*

BRUCE LEHMAN

*Attesting Officer*     *Commissioner of Patents and Trademarks*